United States Patent [19]
Griffith et al.

[11] Patent Number: 5,375,315
[45] Date of Patent: Dec. 27, 1994

[54] PALLET NAIL PRESS AND METHOD OF USE

[75] Inventors: Michael Griffith, Caledonia; Michael Meighen, Wadsworth; Lionel W. Trebilcock, Vienna; Lionel F. Trebilcock; Gary L. Trebilcock, both of Girard, all of Ohio

[73] Assignee: Litco International, Inc., Vienna, Ohio

[21] Appl. No.: 208,692

[22] Filed: Mar. 11, 1994

[51] Int. Cl.5 ............................................. B23P 11/00
[52] U.S. Cl. ..................................... 29/432; 29/714; 29/772; 29/822; 100/269 A
[58] Field of Search ............... 29/402.01, 432, 714, 29/772, 822, 238, 252; 100/226, 269 A

[56] References Cited

U.S. PATENT DOCUMENTS

| | | |
|---|---|---|
| 3,376,808 | 4/1968 | Beckett et al. |
| 3,557,439 | 1/1971 | Dykeman ............................ 29/772 |
| 3,823,861 | 7/1974 | Jureit et al. |
| 3,908,885 | 9/1975 | Scott ..................................... 29/432 |
| 4,429,629 | 2/1984 | Leonard ........................... 100/269 A |
| 4,669,184 | 6/1987 | Castillo ................................ 29/432 |
| 4,998,336 | 3/1991 | Papsdorf .............................. 29/432 |
| 5,285,720 | 2/1994 | Wright ................................. 29/432 |

OTHER PUBLICATIONS

Pendiry Australian patent application (#646,554), Abstract and Figures only.

Primary Examiner—Mark Rosenbaum
Assistant Examiner—David P. Bryant
Attorney, Agent, or Firm—Robert J. Herberger

[57] ABSTRACT

A pallet nail press used to drive random fasteners extending from the pallet after repair and assembly has taken place. The pallet nail press includes multiple continuous feed and exit conveyors that pre-position individual repaired pallets within a press support assembly having multiple vertical lift beams below the conveyors. The vertical lift beams are driven by a lift bag assembly. In use, the pre-positioned pallet is lifted off the continuous conveyor and driven against correspondingly positioned anvil beams driving the outwardly extending fasteners flush with the pallet. Sensors activate positioning pins and lift bag air assembly in a selected nature, cycling the pallets through the pallet nail press.

16 Claims, 3 Drawing Sheets

PALLET NAIL PRESS AND METHOD OF USE

BACKGROUND OF THE INVENTION

1. Technical Field

This device relates to a press used in repairing the damaged portions of a wooden pallet or skid.

Wooden pallets are used to transport a variety of bulk goods and equipment as required in manufacturing and warehousing operations. Wooden pallets are subject to damage in use that occurs from handling with forklifts or the like equipment. Since such pallets are in wide use a large number of damaged and unusable pallets must be repaired or discarded daily. Repair of damaged pallets has become an increasingly sound alternative to disposal due to the sheer volume of pallets that require repair each day. In the repair process damaged portions of the pallets are replaced in a repair station in a multiple conveyor line to facilitate the volume of movement required. As the repairs are made, typically some of the nails used are not driven flush due to existing obstructions, such as original construction nails or wood irregularities. Thus, random upstanding nails if not corrected will damage goods and equipment when in use. Accordingly, it has heretofore been required that a manual inspection be made of each repaired pallet and the upstanding nails be driven down or over by hand or rolling press reducing the efficiency and effectiveness in volume of the pallet repair operation. It would be desirable to have a fully automated high volume pallet nail press to provide a one-stop nail driver which does not require the time consuming visual inspection and manual nail driving hereinbefore required.

It is an object of this invention, therefore, to address this issue and to provide a self-contained automatic pallet nail press which will selectively position a pallet within the press, drive simultaneously whatever nails are upstanding and then exit the press all in an automated operation.

2. Description of Prior Art

Prior art devices of this type do not exist in this specific field. Repair pallet presses have heretofore been used to secure reinforcing nailer plates onto damaged pallet stringers by applying the plates in overlay relation on opposing sides of a damaged portion, see for example U.S. Pat. No. 3,823,861. This patent discloses a pivoted arm that is moved towards and away from an opposing pallet, driving simultaneously oppositely disposed reinforcing nailing plates into the damaged stringer.

A nail rolling apparatus is known to exist as illustrated in a pending Australian patent application which utilizes a series of vertically spaced opposing sets of rollers in which one roller set is movably adjusted for pallet height and rolls over the upstanding nails flattening same.

Analogous fluid driven pneumatic presses are known to use inflatable actuator bags that drive a movable plate forward against a fixed base plate, see for example U.S. Pat. No. 3,376,808.

SUMMARY OF THE INVENTION

An automated continuous pallet nailer press that selectively positions individual repaired wooden pallets within a press support structure vertically lifting each pallet sequentially off a continuous conveyor and engaging the pallet against strategically positioned overhead drive elements which simultaneously drives multiple random upstanding fasteners flush with the surface of the pallet.

DESCRIPTION OF THE PREFERRED EMBODIMENTS

Figure 1:
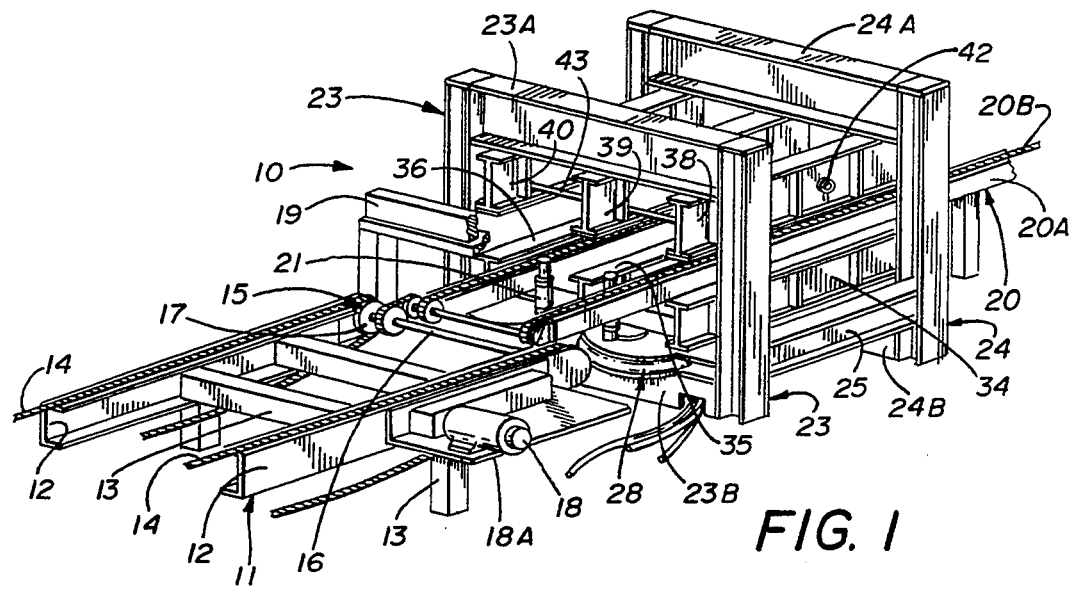
FIG. 1 is a perspective view of the pallet nail press of the invention.

Referring to FIG. 1 of the drawings, a pallet nail press 10 and an infeed conveyor 11 can be seen. The infeed conveyor 11 is aligned to the left of the pallet nail press 10 and has a pair of horizontally positioned parallel spaced guide tracks 12 on a support frame 13. Continuous conveyor chains 14 are respectively positioned on said guide tracks 12 engaged over drive sprocket assemblies 15 having drive axle 16 and sprockets 17 adjacent the pallet repair press. The drive sprocket assembly 15 is powered by a motor 18 on a support bracket 18A as is well known and understood by those skilled in the art.

Figure 5:
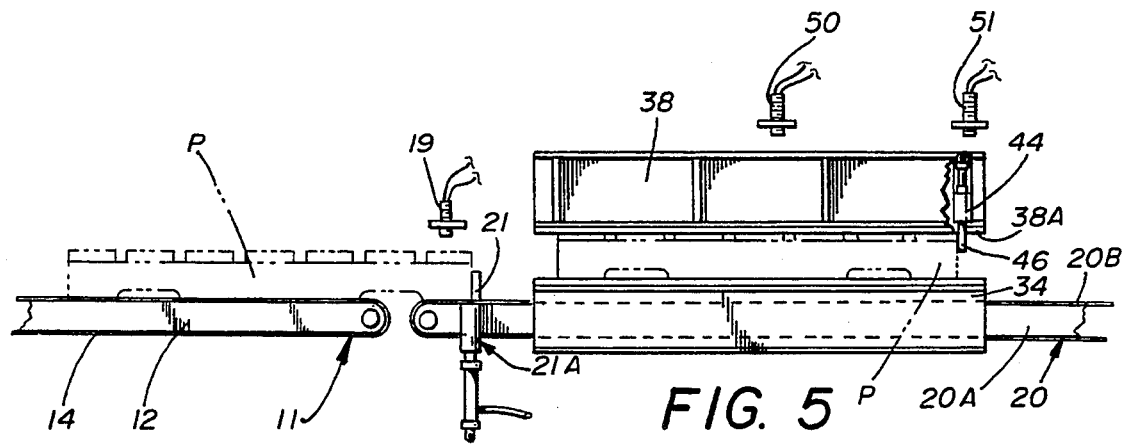
FIG. 5 is a simplified representation of an operating sequence for the pallet nail press and accompanying conveyor systems.

A pallet stop bar assembly 19 can best be seen in FIG. 5 of the drawings and is positioned generally between the terminal end of said infeed conveyor 11 and a pallet press conveyor 20.

The pallet stop bar assembly provides an overhead restriction to maintain a pallet P on the infeed conveyor 11 during initial infeed when another pallet is in the pallet nail press 10.

The pallet press conveyor 20 has spaced parallel tracks 20A and respective continuous conveyor chains 20B thereon which extends into and through the pallet nail press 10. A pair of movable pallet indexing pins 21 are positioned inwardly below the pallet press conveyor 20 and are best seen in FIG. 5 of the drawings. Each of the pallet indexing pins 21 are retractable by accompanying piston and cylinder assemblies 21A and can be selectively advanced above the pallet press conveyor 20's surface for engagement with the pallet P as will be described hereinafter.

Referring now to FIGS. 1–4 of the drawings, the pallet nail press 10 has a support frame defining pairs of spaced vertical support beams 23 and 24 with respective upper and lower cross supports 23A and 23B and 24A and 24B. The vertical support beams 23 and 24 are interconnected by interengaging support beams 25 and 26 respectively, best seen in FIGS. 1, 2, and 3 of the drawings and partially broken away in FIG. 4. Pairs of air bags 27 and 28 are positioned on said respective lower cross support 23B and 24B on circular mounting areas defined by multiple upper and lower mounting plates 29 and 30.

Lift beams 31 and 32 are positioned across said respective air bag pairs 27 and 28. Guide pins 31A and B and 32A and B respectively extending from said lower cross support 23B and 24B through aligned apertures in said lift beams 31 and 32.

Each of said lift beams 31 and 32 has longitudinally spaced notches at 33 on its upper surface inwardly from its free ends to provide clearance for the tracks 20A during use.

Multiple hammer I-beams 34, 35, and 36 extend in spaced parallel relation between and on top of said lift beams 31 and 32 completing the movable portion of the pallet nail press 10.

Safety stops 37 extend from and are secured to each of said vertical support beams pairs 23 and 24 by multiple fasteners F. The safety stops 37 prevent unrestricted vertical travel of the hammer I-beams 34, 35 and 36 should a pallet P, best seen in FIGS. 4 and 5 in broken lines, not be positioned within the press by error.

Figure 2:
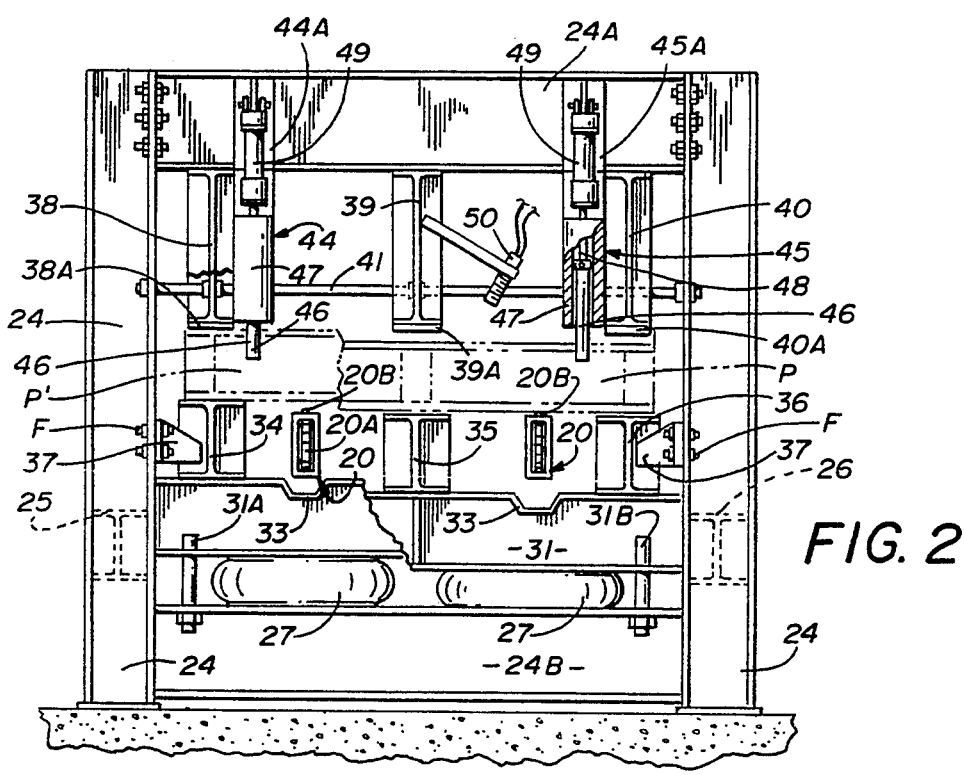
FIG. 2 is an end elevational view of lines 2—2 of FIG. 3 with portions broken away indicating activation of the press with a pallet shown in broken lines within.
Figure 4:
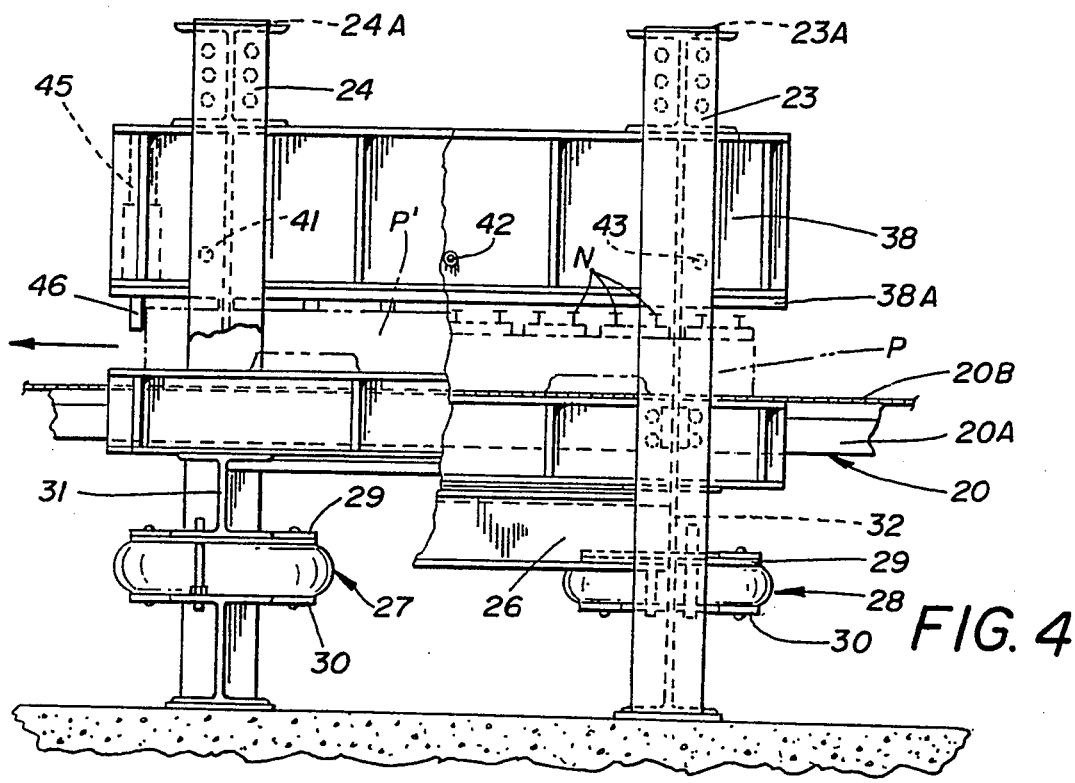
FIG. 4 is a side elevational view of a pallet nail press with a portion broken away illustrating activation indicated in use.

Referring now to FIGS. 1, 2, and 4 of the drawings, a plurality of anvil I-beams 38, 39 and 40 can be seen secured to and extending between said upper support beams 23A and 24A. Each of said anvil I-beams are vertically aligned with a hammer I-beam. Each of said anvil I-beams has a reinforcing plate 38A, 39A and 40A respectively extending along its longitudinal surface opposite said aligned hammer I-beams hereinbefore disclosed. The suspended anvil I-beams 38–40 provide an impact surface for the pallet P as will be discussed hereinafter.

Multiple position and stabilization rods 41, 42, and 43 are threadably secured transversely between and through respective horizontally aligned apertures in said anvil I-beams 38–40. The positioning and stabilization rods 41 and 43 are secured to respective vertical support beam pairs 23 and 24 at their oppositely disposed free ends as best seen in FIGS. 2 and 3 of the drawings while the position and support rod 42 extends only through and between said respective anvil I-beams 38–40.

Figure 3:
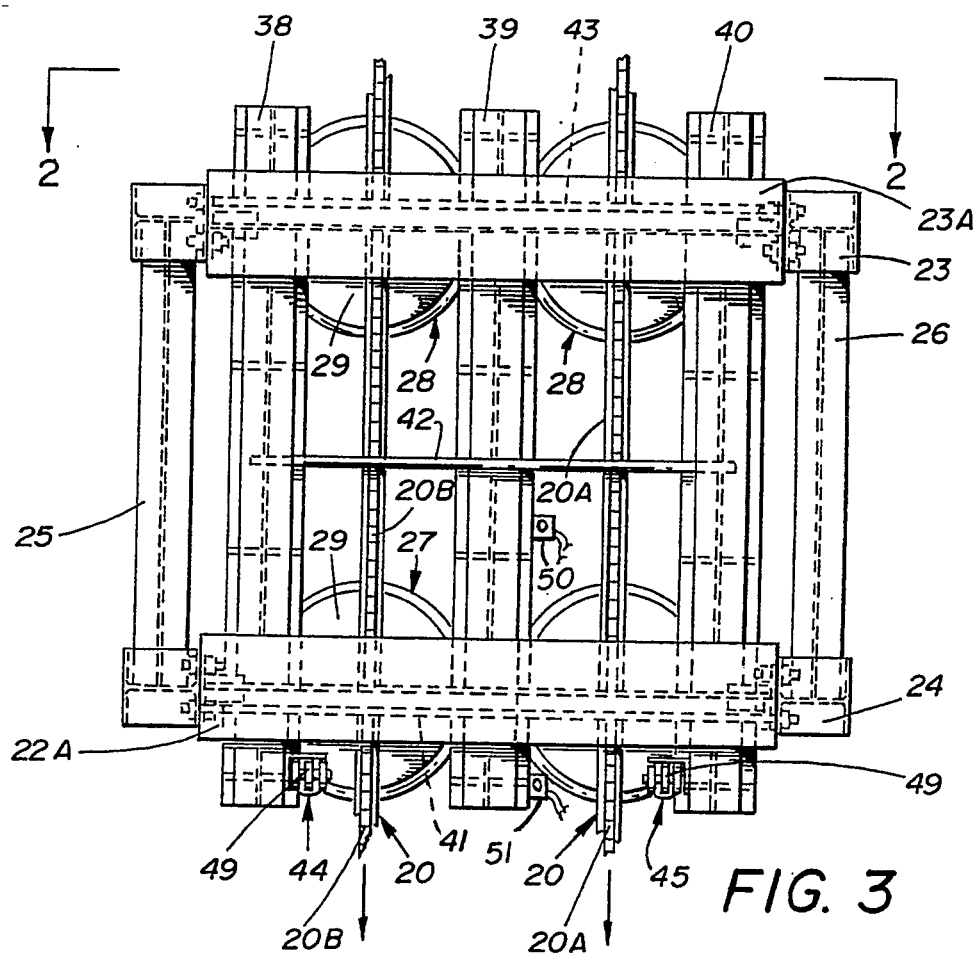
FIG. 3 is a top plan view if the pallet nail press of the invention.

Referring now to FIGS. 2, 3 and 4 of the drawings, pallet exit stop pin assemblies 44 and 45 are mounted on respective mounting brackets 44A and 45A secured to and extending downwardly from said upper support beams 24A providing for a positive stop and positioning of the pallet P within the pallet nail press 10.

Each of said exit stop pin assemblies 44 and 45 have a registration pin 46 within a guide sleeve 47 interconnected to a piston rod 48 of a piston and cylinder assembly 49 which allows for selective retraction and extension of said registration pin 46 from said guide sleeve 47 as best seen in FIG. 2 of the drawings.

In use, the pallet P enters the pallet nail press 10 and is detected by an electronic sensor 50 that via a control network (as well known within the art) activates pallet exit stop pin assemblies 44 and 45 to a down position and indexing pins 21 to an up position. When the pallet P engages or is about to engage against the exit stop pins 46, a secondary electronic sensor 51 positioned adjacent the exit stop pin assemblies 44 and 45, activates inflation of the air bag pairs 27 and 28 driving the multiple hammer I-beams upwardly lifting the pallet P off the pallet press conveyor 20 against the respective vertically aligned anvil I-beams 38, 39 and 40 thereabove. The pressure exerted by the air bag pairs 27 and 28 is between about 10 lbs. per inch squared to 200 lbs. per inch squared with the optimum pressure being between about 60 lbs. per square inch and 100 lbs. per square inch. Any outwardly extending nails in the pallet are driven into the pallet's surface in one continuous motion. Once the press upward cycle is complete, the air bag pairs 27 and 28 are deflated and the registration pins 46 are retracted allowing the repaired pallet to engage the pallet press conveyor 20 and exit the pallet nail press 10 thereon. As the pallet P clears the electronic sensor 50, it activates the retraction of the indexing pins 21 (down) allowing for a new pallet P to enter the pallet nail press, thus repeating the cycle.

Referring now to FIGS. 2 and 4 of the drawings, it will be seen that they illustrate both an activated and non-activated position of the pallet nail press 10 showing an activated position an elevated pallet P' in broken lines engaged between the anvil I-beams 38, 39 and 40 and the hammer I-beams 34–36 by the respective inflatable air bag pairs 27 and 28 as hereinbefore described. The secondary electronic sensor 51 determines when the pallet P has cleared the pallet nail press 10 reactivating the pallet exit stop pin assemblies 44 and 45 for the next pallet P. The electronic sensor 50 activates the infeed indexing pins 21 as hereinbefore described thereby releasing the next pallet onto the pallet press conveyor 20.

Figure 6:
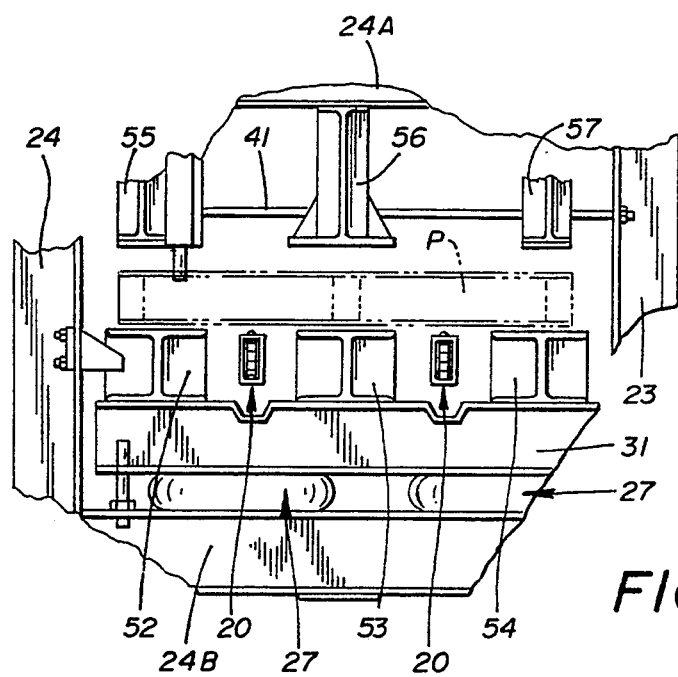
FIG. 6 is a simplified representation of an alternate form of the invention illustrating increased surface area of the lift and press engagement portions.

An alternate form of the invention can be seen in FIG. 6 in which the dimensional characteristics of the respective hammer I-beams and anvil I-beams are increased as indicated by modified hammer I-beams 52, 53, 54 and modified anvil beams 55, 56 and 57. The increased dimensional characteristics of said respective alternate I-beam configurations would allow for different pallet engagement areas which might be required in alternate pallet construction or different repair configurations requiring larger pallet engagement surface areas to be addressed.

It will thus be seen that a repair nail press 10 has been illustrated and described and it will be apparent to those skilled in the art that various changes and modifications may be made therein without departing from the spirit of the invention, therefore we claim:

1. A pallet nail press for engaging a pallet to embed any outwardly extending pallet fasteners therein, the pallet nail press comprising:
   a) a main support frame;
   b) an anvil beam element secured to and within said frame;
   c) a hammer beam element movably positioned within said frame, the hammer beam element being vertically aligned with said anvil beam element;
   d) a flexible inflatable bag for advancing said hammer beam element towards said anvil beam element upon pressurization of said bag;
   e) a conveyor system extending into and through said main support frame for conveyorizing said pallet between said hammer beam element and said anvil beam element;
   f) indexing means for selectively indexing said pallet on said conveyor system through said main support frame;
   g) activating means for inflating and deflating said flexible inflatable bag when said pallet is positioned within said main support frame.

2. The pallet nail press of claim 1, wherein there are a plurality of flexible inflatable bags positioned in opposing pairs under said hammer beam element.

3. The pallet nail press of claim 1, wherein there are a plurality of hammer beam elements positioned in spaced parallel relation to one another.

4. The pallet nail press of claim 1, wherein there are a plurality of anvil beam elements secured to said main support frame positioned in spaced parallel relation to one another.

5. The pallet nail press of claim 1, wherein air is used to inflate the flexible inflatable bag.

6. The pallet nail press of claim 1, wherein said support frame comprises pairs of spaced vertical support beams interengaging upper and lower cross support beams therebetween.

7. The pallet nail press of claim 1, wherein said indexing means and activating means act in unison and said indexing means includes:
 a) an electronic sensor;
 b) an infeed indexing pin assembly and an exit stop pin assembly which react to signals from said electronic sensor, said infeed and exit stop pin assemblies being in spaced relation to one another; and
 c) said infeed indexing pin assembly being in spaced relation to said main support frame.

8. The pallet nail press of claim 7, wherein each said infeed indexing pin and exit stop pin assemblies comprise a guide sleeve, a registration pin movably positioned within said sleeve, a piston and cylinder assembly interconnected to said registration pin and a source of pressure.

9. The pallet nail press of claim 7, further comprising a pallet stop bar positioned above said conveyor system and being vertically aligned with said infeed indexing pin assembly.

10. The pallet nail press of claim 1, further comprising a guide means for guiding the vertical movement of said hammer beam element.

11. The pallet nail press of claim 10, wherein said guide means for said hammer beam element comprises guide pins extending from said main support frame through apertures in said hammer beam element.

12. A method for pressing wooden pallets to embed any outwardly extending pallet fasteners therein using a pallet nail press having a movable hammer beam element and a fixed anvil beam element, said method comprising the following steps:
 a) transporting a pallet on a conveyor in a longitudinal direction relative to the pallet nail press, the pallet being horizonal on said conveyor, said conveyor extending through said pallet nail press;
 b) positioning the conveyorized pallet between said hammer beam element and said anvil beam element within said pallet nail press;
 c) lifting the positioned pallet from the conveyor in a vertical direction relative to the conveyor, said lifting being performed by the vertically movable hammer beam element;
 d) engaging the lifted pallet between the hammer beam element and the anvil beam element;
 e) applying an impact force to the engaged pallet to embed any outwardly extending pallet fasteners therein; and
 f) after applying the impact force, repositioning said pallet on the conveyor to exit said pallet from said pallet nail press.

13. The method of claim 12, wherein said lifting step includes inflating a bag under the hammer beam element.

14. The method of claim 12, wherein said positioning step includes electronically sensing the pallet's position on the conveyor relative to said pallet nail press.

15. The method of claim 14, wherein, in said positioning step, an infeed indexing pin assembly and an exit stop pin assembly react to signals from an electronic sensing element.

16. The method of claim 15, wherein, in said positioning step, a pallet stop bar vertically positioned over the infeed indexing pin assembly stops a pallet from entering the pallet nail press when the infeed indexing assembly is activated.

* * * * *